Figure 1:
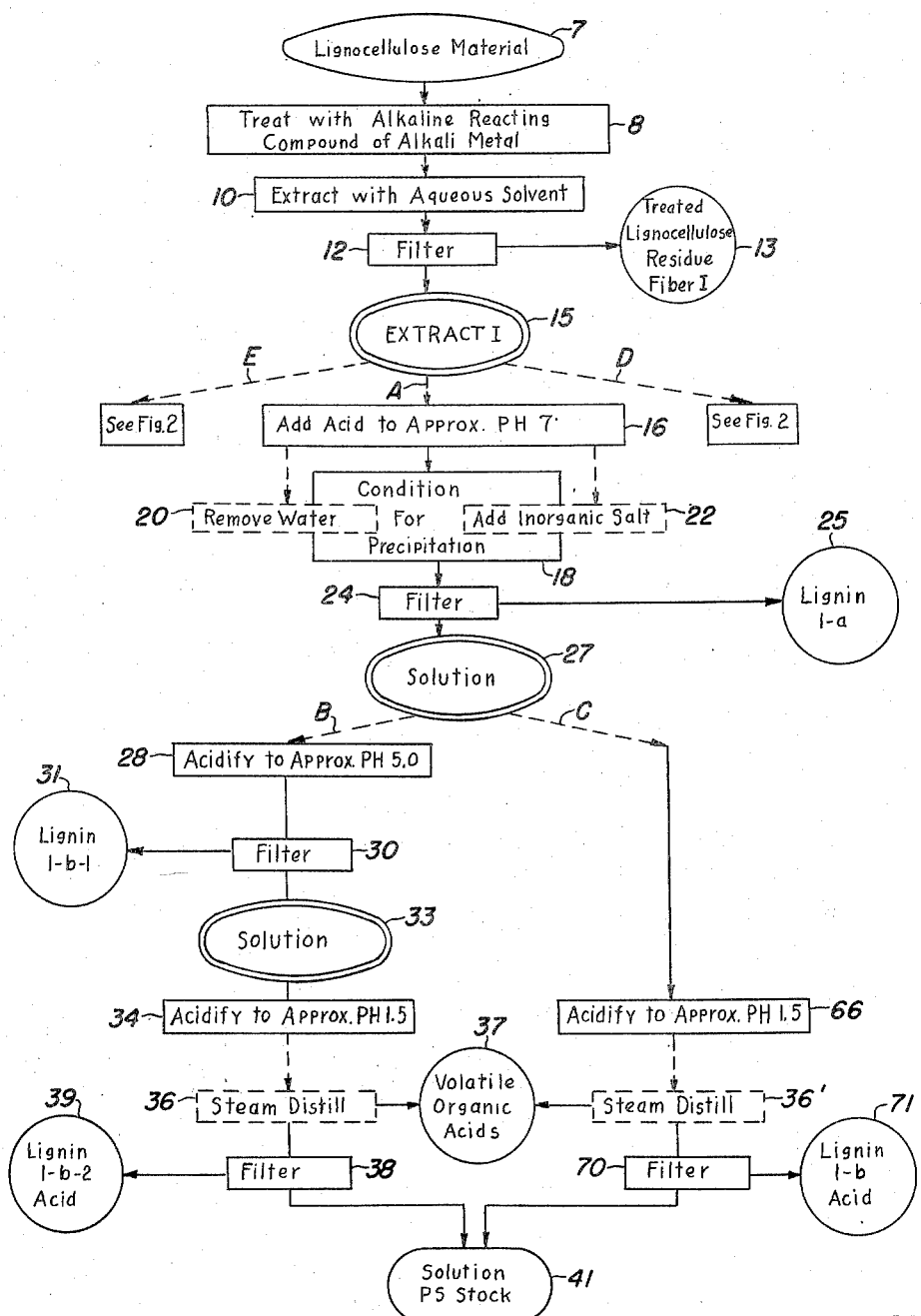

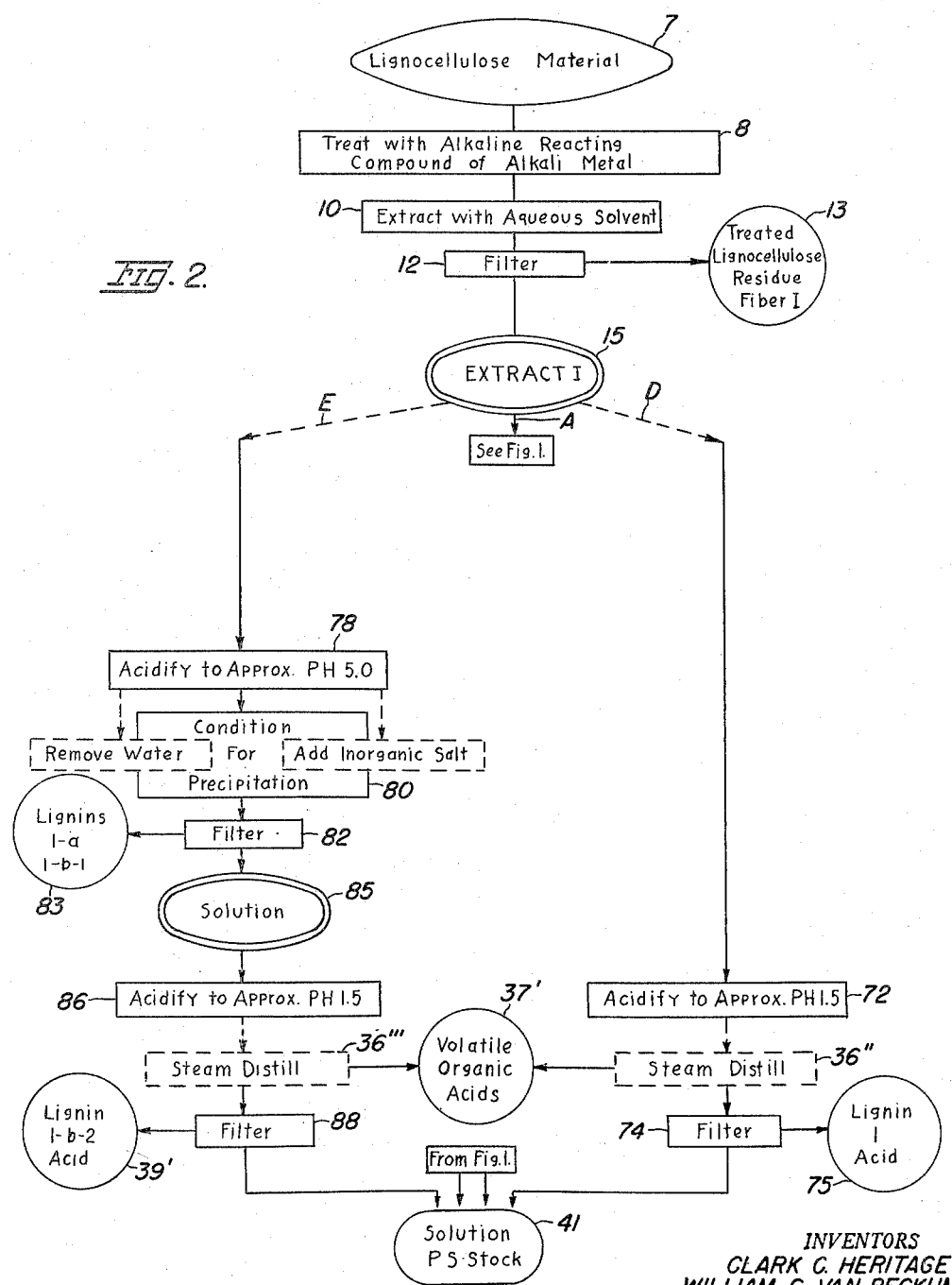

UNITED STATES PATENT OFFICE 2,541,058

PROCESSING OF LIGNOCELLULOSE MATERIALS

Clark C. Heritage, Cloquet, Minn., and William G. Van Beckum, Longview, Wash., assignors to Wood Conversion Company, Cloquet, Minn., a corporation of Delaware Application June 16, 1948, Serial No. 33,278

25 Claims. (Cl. 260—124)

This invention relates to a process for the isolation of non-cellulosic products from lignocellulose materials with recovery of cellulosic fiber as an attendant product. More particularly the invention pertains to the separation of lignocellulose materials comprising cellulose, lignin, and polysaccharides-other-than-cellulose, into a cellulosic fiber residue of variable and controllable composition and fractions containing useful non-cellulosic substances, i. e. lignins, and other organics having a substantial content of polysaccharides-other-than-cellulose.

The process of the invention is applicable to a diversity of lignocellulose materia's, but is especially applicable to the fractionation of wood substance. Substantially all species of woods may be thus fractionated, representative and suitable woods being aspen, jack pine, western larch, Douglas fir, western red cedar, and many others. Substantial'y the same procedure and variations of it may be employed with all these varieties of woods, the results varying in degree.

In practicing the present invention, when wood is used as a source of lignocellulose materials, it is first reduced to fibrous form by mechanical or other methods which do not subject the wood to the action of added chemicals other than water. This fiberizing is carried to the point where it results in the conversion of the wood substance to fibers physically consisting substantial'y all of ultimate fibers and opened-up bundles of ultimate fibers, hereinafter all referred to as fiber, and constitutionally consisting primarily of cellulose, lignin, and other organics including po'ysaccharides-other-than-cellulose, the latter being herein frequently referred to merely as "polysaccharides," these three constituents being present in mutual ratios in the range of compositions from those characterizing the raw wood from which the fiber is derived and those characterizing the water-insoluble content of the raw wood from which the fiber is derived Fiber containing cellulose, lignin, and other organics including polysaccharides-other-than-cellulose in the ratios characterizing the water-insoluble content of the raw wood from which the fiber is derived, is exemplified by raw wood fiber which has been so treated with water as to extract the water-soluble constituents and leave as a fibrous residue the water-insoluble content of the raw wood The production of such fiber from woods such as western larch, is of particular interest, since these woods contain high percentages of water extractable substances, e. g. about 23% in the case of western larch. It may therefore be commercially desirable in the case of these woods to extract them with water in order to isolate as commercial products the natural water-soluble fraction of the wood substance. A fiber form of the extracted wood may be employed to advantage as a raw material for the fractionation process of the instant invention.

The wood fibers to which the process of the invention may be satisfactorily applied may be produced, for example, by the method described in U. S. Patent No. 1,913,607 to McMillan. This patent describes a mechanical defibering process entirely free from chemical action, which comprises combing out substantially ultimate fibers from wood by contacting logs of wood with high speed rotary radial elements, such as pointed pins projecting from an axle, like bristles. Fiber produced by this process is herein referred to as McMillan fiber, or pin fiber, and it is an excellent raw wood fiber for the present invention. Such pin fiber may be processed with or without an initial water extraction.

Wood fiber suitable for use in the process of the present invention may also be prepared by the method described in U. S. Patent No. 2,008,-892 to Asplund. In this method wood substance is defibered by mechanically rolling and crushing the wood between relatively rotating opposing disks, while simultaneously applying steam under sufficient pressure markedly to soften the lignin in the midd.e lamella, thus permitting easy defibration of the softened wood. The fiber resulting from this practice, in efficient operation of the commercial Asplund machine, is termed herein "normal" Asplund fiber, or normal defibrator fiber. It is prepared, for example, by so defibrating the wood while exposing it for about one minute to high pressure steam at a temperature sufficient to effect the desired softening. The significance of the term "normal" is with reference to practical minimum operating time and temperature, as described, because increase of temperature or time has a chemical effect on the wood substance which may be measured in terms of water-soluble content formed by the action of the steam.

Other methods for producing fibers from wood substance may also be used, provided said methods do not subject the wood to the action of added chemical agents other than liquid water or steam, or substantially alter the constituents in a manner other than those stated, excepting further, a treatment with alkali-metal hydroxide for the described purposes of the present invention.

Heretofore, lignocellulose material has been converted to pulp suitable for use in the manufacture of paper, fiber-board, and other products, by various mechanical and chemical methods, or combinations of such methods. It is well-known, for example, to prepare paper-making pulp by treating raw wood with bisulfite salts, e. g. calcium bisulfite or magnesium bisulfite. It is also well-known to subject raw wood to the action of numerous alkaline chemicals alone or in admixture, as in the well-known soda, kraft or sulfate, and monosulfite processes. None of these methods, however, has affected the precise fractionation of wood substance by simple processes carried out under carefully controlled and standardized conditions which facilitate the separation of useful lignin and polysaccharide fractions while at the same time producing a high yield of useful cellulosic fiber of reproducible properties.

It is, therefore, the general object of the present invention to treat lignocellulose materials of nature for isolating on the one hand mutually separable lignins and organics including polysaccharides-other-than-cellulose, and on the other hand a useful cellulose fiber.

It is also an object of the present invention to separate lignocellulose materials into fractions together comprising isolated lignins, isolated organics including isolated polysaccharides-other-than-cellulose, and isolated cellulosic fiber of controllable quality.

A further object of the invention is to produce by the treatment of wood substance at least one fraction comprising predominantly lignin.

It is another object of the invention to produce by treatment of wood substance at least one fraction comprising predominantly polysaccharides-other-than-cellulose.

Still another object of the invention is to produce as a by-product, cellulosic fibers of such quality as to be suitable for subsequent use in the preparation of high yields of technical or chemical (for cellulose derivatives) cellulose of controlled and reproducible viscosity characteristics.

Another object is to provide a satisfactory method for the separation of lignins and organics including polysaccharides-other-than-cellulose from the same solution.

A further object is to furnish a simple process for the fractionation of lignocellulose materials into lignins, polysaccharides-other-than-cellulose and other organics, and cellulose fibers, without the necessity of using pressure vessels or protracted cooking operations.

It is another object to fractionate lignocellulose material simply and by the use of readily available low-cost agents.

It is a further object of the invention to provide a process for the fractionation of wood into lignin, organics including polysaccarides-other-than-cellulose, and cellulosic fiber, wherein substantially all of the wood substance may be recovered in useful form, and little if any need be lost or wasted.

Still another object is to provide a method for the fractionation of wood substance, which method results in the recovery of lignins, organics including polysaccharides-other-than-cellulose, and cellulosic fibers, each in a chemical constitutional form closely approximating that in which it is present in the raw wood.

It is a particular object of the invention to provide a process wherein lignocellulose material, which has been reduced to substantially ultimate fiber form, with or without the removal of the water soluble content of the said lignocellulose material, may be readily separated into a cellulosic fiber fraction and a dissolved non-cellulosic fraction by the action of an alkaline reacting compound of an alkali metal and wherein said compound is effectively used in widely varying percentage concentrations and in widely varying ratios of amounts per unit of fiber to provide a substantially uniform mild treatment of the fiber throughout the varying range of conditions.

Other objects and advantages of the invention will become apparent from the following description and explanation in connection with the appended drawings wherein process steps are shown in rectangular blocks, materials in process are shown in double-curved line inclosures, and end products are shown in single ring circles. Precipitates are shown in circles disposed laterally of the filter step by which they are separated and solutions resulting from filtration steps are shown in elliptical inclosures. Alternative sequences and steps are indicated by broken lines.

Figure 1 is a flow chart diagrammatically representing in one sequence an embodiment of the invention for complete practice of the process, through the step of forming the solution containing the other organic materials including polysaccharides-other-than-cellulose, herein arbitrarily designated as product PS—1. There is also included an alternative sequence for the practice of the process in contracted form.

Figure 2 is a flow chart corresponding to Figure 1, but showing the practice of the process through the step of forming the solution containing the said other organic materials by two further alternative sequences.

It has been found that the above and other objects of the invention may be accomplished by subjecting lignocellulose fiber, e. g. wood substance in fiber forms, to the action of a limited proportion of alkali metal hydroxide in an aqueous solution thereof, or in a solid form on moist fiber, separating a resulting solution, using added water if necessary or desired, from residual fiber, and separating from the said resulting solution, and from each other, its contents of lignin and of organics including polysaccharides-other-than-cellulose. More specifically stated lignocellulose materials are fractionated in accordance with the present invention by treating such materials in fiber form with water and alkali-metal hydroxide, e. g. sodium hydroxide, at atmospheric pressure and at a temperature preferably not over the atmospheric boiling point therefor where liquid bodies are involved, or at higher temperatures in the absence of liquid bodies, for a time sufficient substantially to extract from the wood substance a substantial proportion of the content of lignin and of other organic materials such as polysaccharides-other-than-cellulose, and to exhaust the potency of the solution toward like residual fiber. Thereupon the fibrous residue is separated from the alkaline extract by adding more water, if necessary, which extract contains the lignin and said organics, whereupon the said lignin and said organics are separated from the said alkaline solution and from each other.

The alkali-metal hydroxide is used in any amount, expressed in terms of caustic soda, upwardly from that which leaves an alkaline extract under the conditions employed, usually about 2.5 parts to 100 parts of oven dry fiber, to a large amount, for example, an amount equal to the dry weight of the fiber. The alkali-metal hydroxide may be used in dissolved form in suspensions of the fiber in water, and may be applied as a solid to moist fiber without a suspending quantity of water. The ratio of fiber to a liquid mass containing it is expressed as "% consistency." A 4% consistency as a slurry may be used, or modified to a higher consistency, such as a 50% consistency, which is represented by a mass of suitably moist fibers. To minimize the effect of strong causticity on the fiber substance, low usage of water accompanies low usage of alkali-metal hydroxide, and high uses of each go together.

For example, a mass consisting by weight of 100 parts of dry fiber (oven-dry basis), 100 parts of water and 8 parts of sodium hydroxide constitutes a moist mass. It is easier and preferable to react such mass with the aid of heat, as by subjecting it to the action of steam, for example superheated steam at 140° C. atmospheric pressure for a period of about 60 minutes.

The initial fibers become acted upon by alkali metal hydroxide to produce a mixture of residual fibers and a spent liquor, both being the products of reaction and extraction between the lignocellulose, water and alkali metal hydroxide, of which latter the usage by weight is from 2.5 to 100 parts (calculated as caustic soda) to 100 parts of oven-dry fiber.

The objective is to provide, for example from wood, a fibrous residue as Fiber I and a solution as Extract I, and to obtain from Extract I a lignin 1 concentrate and a PS—I (polysaccharides-other-than-cellulose) concentrate. Lignin 1 is only a fraction of the lignin in the wood, but it is a fraction having properties different from the lignin obtainable otherwise from the Fiber I. In fact the lignin 1 is solubilized in the Extract I whereas the remaining lignin of the wood is not.

Important steps of the present invention reside in the treatment of Extract I to isolate lignin 1 and the polysaccharide concentrate. As these steps may be carried out in preferred practice, it is possible to recover lignin 1 in two fractions as lignin 1-a and lignin 1-b. The yield of lignins 1-a and 1-b is variable with the kind of wood, the processing to produce Extract I, and the concentration of inorganic salt in Extract I, as will now be explained.

As Extract I is initially secured it may be relatively dilute where a single batch of fiber is treated with an extracting solution, or it may be more concentrated where a recycling or counter-current procedure is used to minimize the water in the system: wood, alkali-metal hydroxide, and water. In all cases the pH value of Extract I will range from neutral to about 10, depending on the extent to which the alkaline content has been spent during the reaction with the lignocellulose material. The Extract I is neutralized by addition of inorganic acid, such as hydrochloric acid, sulfuric acid, or sodium acid sulfate, to bring it to a pH of approximately 7. Thus, an inorganic salt concentration is built up in such a neutralized Extract I, which salt concentration obviously varies with the nature of Nature I.

Fundamentally, the process may be operated to produce a soluble lignin 1-b and an insoluble separable lignin 1-a at pH 7 for a salt-containing extract, and thereafter an insoluble and separable lignin 1-b at a pH of 1.5 in an acidified salt-containing extract. When conditions are such as to prevent the formation of the insoluble and recoverable lignin 1-a, this lignin substance will appear with lignin 1-b as a mixture of the two, namely lignin 1. It has been found that the pH and the inorganic salt content are factors controlling the precipitation of lignins 1-a and 1-b. At pH of 7 lignin 1-a is unfilterably dispersed in the absence of dissolved inorganic salt or an insufficiency thereof. At pH of 7 a solution containing dissolved or unfilterable dispersed lignin and containing dissolved inorganic salt may be processed to effect precipitation of recoverable lignin 1-a, which precipitation is in the nature of a colloidal coagulation induced by the increasing concentration of the inorganic salt content, which coagulation is aided by heat. The same effect may be produced without a dewatering concentration merely by adding salt with or without heating. In both cases, the amount of lignin 1-a precipitated increases as the salt concentration increases, and as the temperature is raised. Accordingly, substantial saturation with salt may be employed for maximum recovery of lignin 1-a. Under these conditions a precipitation-resistant lignin fraction remains in solution, until the solution is acidified, and it is precipitated in increasing amounts as the pH is lowered. At pH of 1.5 this fraction is recoverable as lignin 1-b and is substantially at a maximum in amount if the solution is saturated with salt, whether it is alkali metal sulfate, chloride or other inorganic salt. The flocs of lignin 1-b are more easily filterable when a solution of high salt content is acidified to pH of 1.5.

Because the sulfate radical is easily eliminated by adding alkaline-earth metal oxides or hydroxides to form the insoluble sulfates, the preferred precipitating salt for lignin 1 is alkali-metal sulfate provided as such or produced, for example, by adding sulfuric acid or sodium acid sulfate to neutralize sodium hydroxide in Extract I. Removal of salt content is desirable to provide the hereinafter described PS—I concentrate. Accordingly, the reference to such salt hereinafter appearing will be specific to the preferred sodium sulfate.

The precipitation of lignin 1-a by salt content has its beginning as a milkiness, and as the salt content increases the precipitate changes from slimy to flocculent until at high concentrations short of saturation it becomes more readily filterable. Accordingly, for practical ease of separation and for high yield of lignin 1-a, strong salt solutions are preferred, and preferably a saturated one.

Because the lignin 1 fractions are best recoverable by adequate and substantially saturated concentrations of sodium sulfate, the preferred operations are carried out to effect substantial saturation of the solution with sodium sulfate, without specially providing sodium sulfate, and by providing only sulfuric acid to neutralize the caustic soda which is used to prepare Extract I. To avoid large volumes of water and to avoid concentrating large volumes of water, the water for the system may be reduced in quantity by counter-current or recycling operations. But it is to be understood that the invention is not limited to this preferred procedure.

In a specific embodiment of the invention wood fiber containing substantially all of the water-insoluble content of the wood from which the fiber is derived and prepared as by the hereinabove-referred-to illustrative processes, and physically consisting substantially all of ultimate fibers and opened-up bundles of ultimate fibers and constitutionally consisting primarily of cellulose, lignin, and organics including polysaccharides-other-than-cellulose, said three constituents being present in mutual ratios in the range of contents from those characterizing the raw wood from which the fibers are derived to those characterizing the water-insoluble content of the said raw wood from which the fibers are derived, is treated with a suspending quantity of a dilute aqueous extracting solution of alkali-metal hydroxide. This treatment is carried out at atmospheric pressure and preferably at about the boiling point of the said solution as by applied heat or with steam injection. The boiling point is chosen for ease of control and for simplicity in standardizing the process for reproducible results. The time of treatment is variable depending upon the type of wood being treated and other conditions of the treatment, but in general may be up to about 1 to 2 hours, or such time as shows the extraction to be advancing slowly or to be substantially complete. Continuation of the extracting conditions beyond substantial completion has no harmful results. This treatment extracts from the wood substance a substantial proportion of the content of lignin and of organics such as polysaccharides-other-than-cellulose, and leaves a fibrous residue. After separation of the said fibrous residue from the residual alkaline solution, the latter is treated for isolation of its lignin content and the residual organics, after the removal of lignin. As is more fully explained hereinbelow, this may be accomplished by an integrated series of process steps comprising in variable combinations; neutralization, concentration, filtration, extraction and the addition of chemical reagents, or salt, or both.

DESCRIPTION OF FIGURE 1

Referring to Figure 1 of the drawings, it will be seen that the process of the invention is practiced by treating lignocellulose material 7, e. g., wood fiber, as the starting raw stock, with an alkaline reacting compound of alkali metal as indicated at step 8. The alkaline reagent employed is typically exemplified by sodium hydroxide. The treatment is conducted at an atmospheric pressure and at a temperature in the range from room temperature to about 140° C. The time of treatment is variable, depending upon the type of wood being treated, but in general may be up to about two hours, or such time as shows the extraction to be approaching completion. The reacted mass is extracted at step 10 to separate the soluble matter from the thus treated fiber.

Step 8, or steps 8 and 10, herein referred to as the alkali treatment, extract from the wood substance a substantial proportion of the content of lignin and of other organic materials such as polysaccharides-other-than-cellulose, and leave a fibrous residue. Step 8 may be practiced by a batchwise procedure or by a countercurrent or recycling procedure as hereinafter more fully discussed. Water is usually employed as the solvent in step 10, but the water may also be admixed with other materials in order to contribute specific properties to the solvent or for specific purposes. Water alone, or with such other materials admixed therein is herein referred to as an aqueous solvent. Steps 8 and 10 may be efficiently combined when an aqueous solution of sodium hydroxide is used, but when moist wood fiber is treated with solid sodium hydroxide, or with solutions so concentrated as to amount to syrups, the separate aqueous extraction step 10 will be necessary.

The mass or slurry, with the treated fiber in aqueous suspension, is next filtered at step 12, or otherwise processed to separate the treated lignocellulose residue 13, herein arbitrarily designated as Fiber I from the soluble matter in the filtrate or solution 15 arbitrarily herein designated Extract I, which contains lignin and the other organic materials including the polysaccharides-other-than-cellulose.

Extract I is treated by the combination of alternative sequences AB when practicing the process of the invention in its full form for recovery of the maximum number of separate products. Before proceeding further it is desired to point out that the novel lignin products obtained by this process are found to precipitate in accordance with three rather well defined pH ranges. Lignin 1-a, which consists of the two components lignin 1-a-1 and lignin 1-a-2, precipitates under the hereinafter described conditions in a pH range of from about 7.5 to about 7.0, lignin 1-b-1 precipitates in a pH range of from about 6.0 to about 5.0, and lignin 1-b-2 precipitates in a pH range of from about 3.0 to about 1.5.

As solution 15 is initially obtained it may be relatively dilute where a single batch of fiber is treated with an extracting solution, or it may be more concentrated where a recycling or countercurrent procedure has been used to minimize the water in the system—lignocellulose, alkali, and water. In all cases the pH value of solution 15 will range from neutral to about 10, depending on the extent to which the alkali content has been spent during the reaction with the lignocellulose material. The solution is neutralized at step 16 by addition of inorganic acid, such as hydrochloric acid, sulfuric acid, or sodium acid sulfate, bringing it to a pH of approximately 7. The solution as thus acidified is then conditioned for precipitation at step 18. This conditioning may take one of two forms, or a combination of both— by either the removal of water of solution, step 20, or by the addition of inorganic salts, step 22. Both treatments have in common the fact that they result in the concentration of the solution to a point at which completion of the lignin precipitation is effected. The precipitated lignin is then filtered at step 24 and recovered at step 25 as product lignin 1-a.

It is desired at this point to elaborate on step 18 of conditioning the solution for precipitation of the lignin, especially since this same step is generally applicable at other steps in the process, or in other sequences, to the separation of the other lignin products at other pH ranges. While some precipitation of lignin may occur by virtue of establishment of the pH range for separation of the lignin product concerned, the separation of the lignin in this manner is not sharp, and it is advisable to condition the solution in order to effect the complete precipitation of all the lignin which will separate at the particular pH range. After neutralization, the solution may be concentrated by evaporation, which step, if practiced, is included in step 18. The concentration is continued to a point where the lignin content is precipitated in substantial amount. The solution is preferably maintained neutral during this concentration step by the addition of acid as necessary. It will be obvious that the need for concentration by removal of water will depend upon the usage of alkali and the concentration of the alkali in the solution 15. The more the salt content formed by the interaction between the alkali and the acid, the less will be the extent to which the removal of water needs to be continued. It will be further appreciated in this connection that steps 16 and 18 are more or less interdependent and that either step may be performed first; that is, either the removal of water or the addition of the salt may precede acidification. It is generally more advantageous, however, for step 18 to follow step 16, because, in this manner, full advantage can be taken of the salts formed by the neutralization of the alkali present.

When the conditioning of the solution for precipitation is to be accomplished by the addition of inorganic salts as at 22, sodium acid sulfate is preferably used, and is added until the solution is near saturation with respect to this compound. At this point, precipitation of lignin 1–a can be expected to be substantially complete. The neutral, concentrated solution containing undissolved lignin, preferably at room temperature, is filtered at 24, thereby separating lignin 1–a, designated 25, in the solid form.

The resulting filtrate or solution 27, in the practice of the full process of the invention, is treated by the series of process steps designated as sequence B. The neutral solution 27 remaining after the separation of lignin 1–a is first acidified at step 28 to a pH of approximately 5.0. While not shown in the drawing, step 18 may be repeated to the extent that it is made necessary by the addition of wash water in the filtration step 24. Heat may also be applied to aid in the coagulation of the lignin which is precipitated at this pH range. The solution is then preferably cooled to effect completion of the precipitation, prior to filtration. Filtration at step 30 provides, as a residue, product 31, designated as lignin 1–b–1, and the filtrate as solution 33. The filtrate is further acidified at step 34 to a pH of approximately 1.5 in order to establish the pH value conducive to precipitation of the remaining lignin content.

It may be desirable, particularly in commercial operation, to steam distill the acid solution in order to recover the lower molecular weight volatile organic acids, principally formic and acetic. If so desired, the solution is conveniently next steam distilled at step 36, the acids being recovered as product 37. The solution may be filtered at step 38 either before or after removal of the volatile acids. If it is not desired to remove the organic acids, the steam distillation is omitted.

The residue from filtration step 38 consists of product 39, designated 1–b–2, and as thus recovered, is in its acid form. The filtrate from filtration step 39 consists of a solution 41 of the said other organic materials including polysaccharides-other-than-cellulose, which product is designated PS—1. It is designated as the PS—1 raw stock because of its large incidental content of inorganic salts.

The separation of lignins 1–b, 1–b–1 and 1–b–2, is more complete when the solution is substantially saturated with sodium sulfate. In adding sulfuric acid initially, sodium sulfate is formed. More may be added if conditions warrant it, to facilitate separation of the lignins, and thus provide a more refined polysaccharide syrup 41.

ALTERNATIVE SEQUENCES OF FIGURES 1 AND 2

It will be apparent from the drawings that alternative sequences of the process may be employed to obtain different combinations of the lignin products. For instance, a shorter, preferred form is illustrated in Figure 1 by a combination of sequences A and C, wherein the solution 27 is acidified directly to a pH of approximately 1.5 at step 66 which results in the precipitation of all the remaining lignin content for the isolation of a product which consists of both lignin 1–b–1 and lignin 1–b–2. As in the case of precipitating lignin product 1–b–1 at step 28, further conditioning of the solution for precipitation of the lignin may be necessary in the manner of step 18 to the extent that the solution has been diluted by washing during filtration step 24. Similarly, the application of heat facilitates coagulation which in turn facilitates filtration. Removal of the volatile organic acids, product 37, may be accomplished by steam distillation at step 36' if desired. The precipitated lignin is filtered at step 70 to recover as product 71 lignin 1–b in its acid form consisting of the combined lignin 1–b–1 and lignin 1–b–2. The resulting filtrate is the same product 41 obtained from sequence B.

A still shorter variation of the invention may be practiced by sequence D illustrated in Figure 3 wherein Extract I is directly acidified to a pH of approximately 1.5 by adding at one time the total amount of acid, e. g. sulfuric acid, at step 72 to fix a pH condition for precipitation of the entire lignin content. The precipitated lignin is filtered at step 74 to recover as product 75 lignin 1 in its acid form. If it is desired to remove the volatile organic acids 37', step 36'' can be practiced similarly to step 36 in sequence B. The resulting solution from filtration step 74 is the same PS—1 product, 41, obtained from sequence AB or from sequence AC. It will be appreciated that lignin 1 contains in one product all four of the ultimate lignin products obtained by the practice of the process, to wit: lignin 1–a–1, lignin 1–a–2, lignin 1–b–1 and lignin 1–b–2.

Practice of the invention by sequence D may be economically desirable for reasons such as the following: In many cases a lignin material may be satisfactory for use having the less sharply defined properties of lignin 1 and it would be unnecessary and uneconomic to go to the work of separating the individual lignin products. Another situation where it will be desirable to practice sequence D is in the cases where there is greater interest in obtaining the PS—1 stock than there is in obtaining the lignin products. Lignin 1 can still be fractionated into the individual lignin products of which it consists by redissolving it in alkali and subjecting it to the subcombination process sequences of A and B or A and C, in which case the resulting filtrate obtained in steps 38 or 70 is discarded. It will be appreciated in this same connection that lignin 1–b when obtained by sequence AC can also be processed to recover its two lignin components by the practice of sequence B as a subcombination of the process in the same relative manner.

Still another alternative sequence which may be employed is that designated by the letter E in Figure 3 wherein the process is practiced to obtain the lignin in two products, the first product being a combination of lignin 1–a and lignin 1–b–1, and the second product being lignin 1–b–2. This sequence of the invention may be particularly desirable where it is desired to obtain the lignin components in accordance with one division of their chemical properties. It will hereinafter be shown that lignin 1–b–2 is the only one of the four basic lignin products which contains a carboxyl group. Hence, this sequence provides for the segregation of the lignin components into one product containing all the non-carboxylic components and into a second product containing the carboxyl component.

Referring to the drawings, it will be seen that the invention according to sequence E is practiced by acidifying Extract I to a pH value of approximately 5.0 at step 78. The acidified solution is then conditioned for precipitation at step 80 performed in the same manner as step 18 in Figure 1 to cause the precipitation of lignin 1–a and lignin 1–b–1. The thus precipitated lignins are filtered at step 82 to provide the composite product designated 83. The filtrate consisting of solution 85 is then acidified to a pH of approximately 1.5 at step 86. Steam distillation step 36''' is next conveniently practiced if it is desired to recover the volatile organic acids 37'. The solution may be further conditioned for precipitation, if necessary, heated to coagulate the lignin, and cooled to facilitate precipitation in the manner described in connection with similar precipitations of lignin. The lignin 1–b–2 which thus precipitates is filtered at step 88 and recovered as product 39' in its acid form. The solution from the filtration step contains the raw PS–1 stock which is the same product 41 obtained from sequences B, C and D.

VARIABLES—THE ALKALI TREATMENT

The operating conditions of the alkali treatment step 8 or the extraction step 19 may be varied within limits as desirable or necessary to suit the particular lignocellulose material being treated, or to adapt the process to the plant equipment in which it is to be practiced, or to provide particular end products, or end products of particular yield, quality or properties. It is the teaching of the invention, however, and critical to its success and practical operation, to use and maintain operating conditions and reagents of strong enough character to effect the cleavage of the lignin polysaccharide complexes existing in the lignocellulose materials, and the separation of lignin, and at the same time the character of such operating conditions and reagents should be sufficiently mild not to cause substantial or drastic changes in constitutional composition of the constituents, thereby preserving in the lignin products of this invention the relatively greater inherent reactivity of naturally occurring lignin.

While the preferred alkali treating agent for step 8 is sodium hydroxide, various alkaline materials may be employed. Suitable alkaline materials include in general the hydroxides of the alkali metals as well as those alkali metal compounds which, being salts of strong bases and weak acids, undergo hydrolysis in aqueous medium to form the alkali metal hydroxides, or their equivalent in alkali-metal ions and hydroxyl ions. Such compounds are, therefore, the basic-acting compounds of the alkali-metals, i. e. of lithium, sodium, potassium, rubidium and cesium. Ammonium compounds may also be used. The hydroxides are generally preferred to other types of compounds, but the carbonates, especially sodium carbonate, may be used to good advantage.

Since the alkali treatment step 8 and the extraction step 19 may be, and frequently are, combined in the ordinary practice of the invention, the considerations affecting these treatments will be hereinafter discussed together except as specifically pointed out when the steps are separated. Three factors are involved relating to the amount of alkali treating agent employed, to wit: usage, strength and consistency. "Usage," as the term is used herein, is defined as the quantity by weight of alkaline reacting compound, calculated in terms of caustic soda, used per 100 parts of fiber on an oven dry basis. For example, a mass consisting by weight of 100 parts dry fiber and 100 parts sodium hydroxide, regardless of the actual water content of the fiber, and regardless of the amount of water of solution of the sodium hydroxide, has a usage of 100%. "Strength," as used herein, has its normal meaning when speaking of chemical solutions, and defines the percentage composition of the alkaline compound, calculated as sodium hydroxide, in the aqueous solution employed. "Consistency," as the term is used herein, defines the ratio of oven dry fiber to a liquid mass containing it and is expressed as the percentage of fiber in the mass. It will be seen that the factor of consistency is a resultant factor determined by the usage and strength.

It has been found that the alkaline reagent may be used in a wide range of strength, provided conditions of usage and consistency are correlated thereto. It has likewise been found that the usage may vary over a wide range provided that the strength and consistency is correlated thereto. Similarly, the consistency may vary over a wide range provided the strength and usage is correlated in a predetermined manner. The usage will usually range from about 2.5 to 100 parts for each 100 parts of oven dry fiber. Strengths of solution are practical in a range varying from .05% up to the use of solid caustic material on moist fiber.

As hereinbefore stated, the invention is ordinarily practiced by the use of the alkali material in aqueous solution, but the alkali may be applied as a solid to moist fiber without the presence of free water. Fiber ordinarily contains absorbed moisture in amounts ranging from 50% to 200% on an oven dry basis. A 100% moisture content, oven dry basis, means 100 parts by weight of oven dry fiber and 100 parts by weight of water. This is a 50% moisture content on a total basis. By way of example, treatment of fiber in a moist mass has been conducted with a mixture of 100 parts of fiber (oven dry basis), 100 parts of water (derived from the moist wood), and 8 parts of sodium hydroxide. When solid caustic is used with moist fiber, containing, say 100% moisture, the usage of caustic is preferably limited to about 10 parts per 100 parts of fiber (oven dry basis), which fixes, in effect, an upper limit of about 10% for the strength of the caustic solution.

Consistencies have been used ranging from as low as 2% up to about 50%. In a typical embodiment of the invention, a .6% strength and a usage of 15% were used which resulted in a consistency of 4%. Such a consistency provides a slurry, whereas the treatment of moist fibers with solid sodium hydroxide as in the preceding example resulted in approximately a 50% consistency represented by a moist mass. Consistency is of fundamental importance as a measure of the relationship between usage and strength and is valuable as a control for determining the extent of solubilization to be effected.

The alkali agent may be used in any amount from that which leaves an alkaline extract under the conditions employed upwards to larger amounts which may be desired to effect a greater degree of solubilization of the lignocellulose material for certain desired end purposes of the process, or to facilitate economy of operation of the process. The stronger the solution, the greater its solubilizing power within limits and the more severe its side effects upon the insoluble fibrous residue. However, strength of solution alone is not of independent significance, because it is related to the relative proportions of the alkaline compound, water and fiber employed, and to the reactivity of the fiber. Experience has shown that an increase in strength accompanied by a constant or increased usage, or an increase in usage accompanied by a constant or increased strength, will result in greater solubilizing action. On the other hand, the extent of the solubilizing action decreases as dilution with water increases, or stated otherwise, as the strength of solution, or the consistency, decreases. To minimize the effect of strong causticity on the fiber substance, low usage of water accompanies low usage of alkali and high uses of each go together.

Of still further consideration is the fact that wood fiber has a natural pH of about 4, and exhibits a neutralizing or consuming power for the alkali. The fibers are characterized by content readily rendered soluble in dilute alkali solution, and other content readily rendered soluble only in much stronger alkali solution, as well as content of intermediate responsiveness. It, therefore, appears that as the natural composition of the wood or fiber is solubilized by the action of alkali, the resultant products exhibit a neutralizing capacity beyond that of the original fiber composition. Thus, when alkali at a given initial strength is supplied to the fiber, the alkali content is depleted and the solution becomes weaker. Hence, the usage of alkali, and consistency of the mass wherein the chemical action takes place, are advantageously employed as control means to regulate the degree of solubilizing of the fiber. The alkali is therefore preferably used in an amount and in a concentration such that the reaction comes to an equilibrium with the residual fiber, and presents a mildly alkaline solution as it reaches or approaches that eluilibrium.

Differences in the amount of soluble components formed and obtained by increasing the usage and concentration while maintaining consistency constant at 4% are shown from the yields obtained from three samples of western red cedar which were extracted at boiling temperature for one hour. These tests show that as the usage was increased from about 5% to 15% to 25%, with a corresponding increase in the concentration, the yield of solubles increased from about 17% to 22% to 24%, thereby showing a direct relationship but of constantly diminishing ratio. The results are summarized in Table I below:

*Table I*

| Usage | Per Cent Concentration of Alkali Solution | PerCentSolubles based on Original Fiber Weight |
|---|---|---|
| 5.4 | 0.2 | 17.3 |
| 15.2 | 0.6 | 22.6 |
| 25.0 | 1.0 | 23.9 |

Results of the same effect were obtained from another series of experiments conducted on normal Asplund aspen fiber with the consistency kept constant at 2% and the usages of caustic soda varied as shown in Table II below. The treatment was continued for two hours at boiling temperature.

*Table II.—Effect of varying usages on extraction of soluble matter*

| Usage | Per Cent Concentration Alkali Solution | Per Cent Solubles based on Original Fiber Weight | Per Cent Composition of Extract | |
|---|---|---|---|---|
| | | | Lignin | Polysaccharides |
| 2.5 | .05 | 11.5 | 34.0 | 66.0 |
| 5.0 | .10 | 14.8 | 32.4 | 67.6 |
| 15 | .30 | 23.7 | 30.8 | 69.2 |
| 25 | .50 | 26.6 | ------ | ------ |
| 50 | 1.00 | 29.0 | 27.6 | 72.4 |
| 100 | 2.00 | 29.7 | 27.6 | 72.4 |

In another case water extracted raw aspen wood fiber was boiled for one hour with a 5.5% solution of caustic soda at 10.4% consistency, corresponding to a usage of 55% (composition—9 parts fiber; 86 water; 5 NaOH). A soluble yield of 33% was obtained. Thus, it can be seen that a wide range of "solubles" can be extracted by the exercise of the controls as described.

Other factors or variable conditions of treatment in step 8 are the matters of temperature, pressure and time of treatment. These factors are closely related and interdependent, and, therefore, will be discussed together. The alkali extraction with a bulk of liquid is desirably carried out at an elevated temperature, preferably a temperature which is about the boiling temperature of the mixture and preferably at atmospheric pressure. For porous masses of high consistency the temperature may be higher, using superheated steam. In ordinary operation, where the process is carried out at normal atmospheric pressure in open vessels at relatively low consistencies and low concentrations, the temperature of operation will be in the range from 80° to about 100° C., or at or near the boiling point as provided by applied heat or steam injection. This temperature is chosen for ease of control and for simplicity in standardizing the process for reproducible results. When a moist or porous mass of fibers at high consistency is to be treated, it is easier and preferable to apply the heat by subjecting such mass to the action of superheated steam, but still at atmospheric pressure. Reaction temperatures somewhat above the normal boiling point of water are obtained by the use of superheated steam. For instance, temperatures as high as 140° C. have been obtained.

The time of treatment is variable, depending upon the type of lignocellulose or species of wood being treated and other conditions of treatment, but, in general, may be up to about 1 to 2 hours, or such time as shows the extraction to be advancing slowly or to be substantially complete. Continuation of the extracting conditions beyond substantial completion of the reaction has no harmful results. When superheated steam is employed, the treatment is continued for one hour. In the case of aspen, jack pine, and similar wood, maximum treating times of the order of one hour are used, relatively little advantage being obtained from longer treating durations. The attainment of substantial equilibrium is an indication of maximum time.

The mechanics of the combined alkali treatment and liquid extraction may vary in well known ways. Both batch and continuous operations variously involving the principle of counter-current contact may be employed. Such continuous type operations are recycling, wherein the alkali solution is used repeatedly on new batches of fiber until the alkali solution becomes so saturated with solubles that a condition of equilibrium with the fiber is approached. Another counter-current process is that in which the alkali solution is used repeatedly and the fiber is subjected to successive or repeated treatments with successive batches of alkali solution in inverse relation to the freshness of the solution; i. e., the first treatment of the fiber is made with the oldest or last use of the solution and the last treatment of the fiber is conducted with the first use or newest solution. This practice is based on the principle that the first soluble content is most easily extracted and the last soluble content is most difficultly extracted, and that, therefore, the strongest and freshest solution should be used on the last step treatment of fiber.

The type of mechanical treatment employed to a large extent determines the proper or optimum consistency at which the treatment should be conducted. The optimum consistency is obviously dependent upon many factors, but principally upon the method of handling the fiber mixture. Thus, varying consistencies may be used depending upon whether the fiber is treated batchwise, or continuously, as in counter-current operation. Where a batch mixing procedure is employed, using fiber and a solution of alkali, the consistency of the reaction mixture is maintained at a level such as to afford ease of manipulation and thoroughness of treatment. When carrying out the extracting treatment in a batch mixer equipped with a mechanically operated agitator, it has been found possible to provide a consistency of up to about 50%, but 10% is preferred as a control objective, and consistencies at 4% have been extensively used. The slurry of 4% consistency has the advantage that it is readily stirrable by simple mechanical means for laboratory or pilot plant operations. In general, disadvantages of the use of higher consistencies are that they result in harsher chemical treatment of the lignocellulose constituents, increase the cost of chemicals used and make for more difficult aqueous extraction of the solubilized components. The use of higher consistencies is advantageous in that they tend to increase the yield of solubles, provide greater concentration of solids in the extract and ordinarily necessitate less evaporation in the subsequent treatment of the extract.

Largely for reasons of economy and efficient operation, it is usually preferred to recycle the caustic extract solution. In this manner the caustic soluble content of the wood substance is built up in alkaline solution to a point where the said solution becomes a more valuable source of extracted materials. Since some of the alkali is consumed by reaction with the wood substance during the extraction process, it is a practice in recycling to add a further quantity of alkali before each treatment of fresh fiber. In the case of woods, such as aspen and jack pine, when extracted at 4% consistency with a .6% solution of caustic soda (a 15% usage), about 60% replacement of the original alkali usage after each extraction is sufficient to fortify the solution to the desired degree, e. g. to a concentration of about 0.6% in the case of caustic soda. This replacement represents consumption in extraction and also mechanical losses. Although the number of times that a caustic alkali solution which has been thus fortified may be used for the extraction of the specified fibers of wood substance is variable, depending largely upon the nature and treatment of the wood, it has been observed that extracting 8 times in the manner stated above, results in the production of an alkaline extract rich in lignins and organic materials including polysaccharides-other-than-cellulose and at the same time leaves a fiber residue of satisfactory composition and properties. The extent to which recycling, or its equivalent operation, may no longer be profitably practiced is determined by the point where the contribution in extract equals the amount of extracted material retained by the fibers upon separating the fibers and the extract.

VARIABLES—PRECIPITATION OF LIGNIN

The acidification provided for at step 16 in sequence A and at numerous other steps in the invention is most conveniently done by adding a mineral acid, preferably sulfuric, for reasons hereinafter pointed out. However, the acidity may be provided for the purpose of practicing this step and without reference to its effect on subsequent steps and products, by any material capable of supplying hydrogen ions and having hydrogen ion dissociation constants such as to produce the necessary pH value, and which does not introduce undesirable or extraneous substances into the solution. Organic acids such as acetic may be used within the range of their pH values. Acid salts, such as sodium acid sulfate, may be advantageously used.

Coming now to a consideration of the factors and corresponding variables involved in the precipitation of the various lignin products, it will be seen that the pH determines the particular lignin product obtained. It has been previously described how the solution is conditioned for precipitation of the lignin by either one or the other of two procedures, or by a combination of both. The solution may be concentrated by removal of the water of solution as by evaporation at ordinary temperatures, heating at atmospheric pressures, or by vaporization at pressures below atmospheric as in partial vacuum. Precipitation may also be brought about without removal of the water by adding inorganic salts with or without heating, which serves to saturate the solution to a point at which the solubility product of the lignin salts is exceeded with resulting precipitation of the lignin. Precipitation of the lignin is progressively induced as the salt concentration increases, so, therefore, substantial saturation with salts should be employed for maximum recovery of lignin 1-a. The precipitation of the lignin by either procedure, or a combination, is almost colloidal in nature.

The precipitation of lignin 1-a by increasing the salt content has its beginning as a milkiness, and as the salt content increases, the precipitate changes from slimy to flocculent until at high concentrations short of saturation it becomes more readily filterable. Accordingly, for practical ease of separation and for high yield of lignin 1-a, strong salt solutions are preferred, and preferably a saturated one. Raising the temperature of the solution mixture is advantageous in that it also serves to coagulate the precipitated lignin, thereby facilitating filtration. So long as the pH is kept in the vicinity of 7 no part of the lignin products identified as lignin 1-b-1 or lignin 1-b-2 will be precipitated regardless of the extent of concentration of the solution or the addition of inorganic salts, until, of course, the concentration become so great that even the soluble inorganic salts start to precipitate or crystallize. However, upon lowering the pH range to 5.0, lignin 1-b-1 will precipitate under the same conditions of concentration and salt content at which lignin 1-a precipitated. But this product is free from any part of lignin 1-b-2. Upon removal of lignin 1-b-1 by filtration and still further acidification of the solution to a pH in the range from 1.5 to 3.0, lignin 1-b-2 acid precipitates under the same conditions of concentration or inorganic salt content. In the event it is desired to take the solution 27 resulting from the removal of lignin 1-a directly to a pH of approximately 1.5, lignin 1-b acid comprising both lignin 1-b-1 and lignin 1-b-2 precipitates under the same conditions described in connection with lignin 1-b-2 acid.

Because the sulfate radical is easily eliminated in subsequent steps in the recovery of other organic materials, by adding alkaline-earth metal oxides or hydroxides to form the insoluble sulfates, the preferred salt for inducing precipitation of the lignin is an alkali-metal sulfate, e. g., sodium sulfate, provided as such or produced, for example, by adding sulfuric acid or sodium acid sulfate to neutralize sodium hydroxide in Extract I. Removal of salt content is desirable to provide the hereinafter described PS—1 concentrate. Accordingly, the references to such salt hereinafter appearing will be specific to the preferred sodium sulfate although it is to be understood that any highly soluble inorganic salt may be employed. The operation is preferably carried out to effect substantial saturation of the solution with sodium sulfate without the necessity of adding the salt, by using sulfuric acid to neutralize the caustic soda which is used to prepare Extract I. To avoid using large volumes of water and to avoid the necessity of concentrating large volumes of water, the water for the system may be advantageously reduced in quantity by employing counter-current or recycling procedures for the alkali-treatment step, but it is to be understood that the invention is not limited in this respect.

The following examples are given to show how the process may be practiced over a wide range of dilution of Extract I with respect to its content of organic materials derived from the lignocellulose material by the treatment with caustic soda and to show how the amount of inorganic salt present affects the precipitation of lignin. In these examples four different species of defibered wood were used as raw material, exemplified by McMillan aspen, normal Asplund aspen, McMillan jack pine, and normal Asplund jack pine. Extract I was prepared in each case by the following procedure: 100 parts of the fiber (oven dry weight basis) were mixed with a 0.6% strength solution of sodium hydroxide to produce a mass of 4% consistency, thus corresponding to a usage of 15 parts by weight of NaOH per 100 parts of fiber. This mixture was boiled for one hour. Then the fiber and liquid were separated by filtration as at step 12. The liquid was neutralized by adding sulfuric acid. The total solid content ranged from about 1.5% to 2% of the solution, of which roughly one-half was organic materials and one-half ash (principally sodium compounds). The results are tabulated in Table III below:

*Table III*

|  | Aspen | | Jack Pine | |
| --- | --- | --- | --- | --- |
|  | McMillan | Asplund | McMillan | Asplund |
|  | Per cent | Per cent | Per cent | Per cent |
| Total Solids | 1.73 | 1.93 | 1.50 | 2.02 |
| Ash | .89 | .85 | .91 | .93 |
| Organics | .84 | 1.08 | .59 | 1.09 |

To determine the effect of salt concentration on the precipitation of lignin, five different portions of the neutralized Extract I obtained from the McMillan aspen, McMillan jack pine and Asplund jack pine fiber treatments discussed in connection with Table III were reduced by evaporation to form a stepwise series of five concentrations of progressively increasing percentage concentration, designated as Concentrates I through V. Considering the solid content of Extract I as neutralized as X amount, Concentrates I to V were prepared so as to have concentrations of approximately 2X, 6X, 12X, 18X and 24X, respectively, the last one being nearly saturated with sodium sulfate. The percentage of salt content for each concentrate for each of the three fibers is shown in Table IV. Extract I solid content is repeated in the first column to facilitate comparison.

*Table IV.—Solid content of concentrates at various concentrations*

|  | Extract I | Concentrate I | Concentrate II | Concentrate III | Concentrate IV | Concentrate V |
| --- | --- | --- | --- | --- | --- | --- |
| McMillan Aspen Fiber _____ percent__ | 1.73 | 3.45 | 11.47 | 23.07 | 32.32 | 37.0 |
| McMillan jack pine Fiber | 1.50 | 2.99 | 11.44 | 21.67 | 33.73 | 39.45 |
| Asplund jack pine Fiber | 2.02 | 4.03 | 13.89 | 26.27 | 34.62 | 45.88 |

Concentrate I from each type of fiber at pH of 7 indicated an incipient precipitation of lignin by a milk grey brown appearance, but no solids could be recovered by centrifuging, filtration or coagulation by heat. However, addition of sodium sulfate almost to saturation completely coagulated a filterable lignin 1-a. The filtrate was acidified to a pH of 1.5 with sulfuric acid, yielding easily filterable lignin 1-b. The yields of lignin are tabulated below in Table V. Another portion of Concentrate I was acidified without filtration to a pH of 1.5 with sulfuric acid to effect precipitation of an easily filterable lignin 1 product which included the lignin 1-a available by salting out at pH of 7.

Concentrates II, III, IV and V precipitated at pH of 7 a colloidally dispersed, milky to muddy, slow-filtering lignin 1-a without addition of any sodium sulfate, the concentrations of the salt derived from neutralization being sufficient and effective without supplemental amount. However, the lignin 1-a precipitate is made more flocculent in the case of Concentrates II, III, and IV by the addition of additional salt and the colloidal portion present is coagulated for easy filtration by heating to about 60° C. The lignins 1-a are readily filtered when the solutions are close to saturation with sodium sulfate. The lignin 1-a obtained from Concentrate V, in the case of the sample prepared from McMillan aspen fiber, was contaminated with precipitated crystals of sodium sulfate, due to having attained the saturation point in producing the concentrate. In the case of the sample prepared from Asplund aspen fiber, Concentrate V was so nearly saturated with sodium sulfate that some crystallization of the latter occurred during filtration.

The yields of lignin 1-a, 1-b and lignin 1 obtained from each of the fibers by the techniques described above are tabulated in Table V below for each of the concentrates. The yields from each concentrate are arranged in two vertical columns, one with no salt added and the other showing the results obtained by the addition of salt. It will be seen in the case of the McMillan aspen fiber and the Asplund aspen fiber that the amount of lignin 1 obtained from Concentrate I, without the addition of salt and by direct acidification only, closely approximated the total lignin 1-a and 1-b obtained by the addition of salt, thereby indicating that direct acidification to a pH of 1.5 is as effective for precipitating lignin as the concentration by means of addition of salt. It will be further noted that the total lignin content obtained from each concentrate except in the case of Concentrate I, whether or not salt was added, was approximately the same. The increased yield of Concentrates II, III, IV and V over that of Concentrate I, even when salt is added to almost saturation, is probably explained by the greater amount of coagulation obtained as a result of the greater extent of heating applied in evaporating Concentrates II, III, IV and V. Note also, that the completeness of precipitation of lignin 1-a at its normal pH range of approximately 7.0 was greatly facilitated by the addition of salt as shown in the case of Asplund aspen fiber, Concentrate II. It, therefore, appears that it is desirable to add salt to the saturation point to effect the complete precipitation of lignin 1-a and to avoid contamination of product lignin 1-b with lignin 1-a which would otherwise result. It will be further seen from an examination of the table that the lignin 1-b yield is considerably smaller than the lignin 1-a yield, and that the total amount of lignin extracted from the same species of wood, but from differently prepared fibers, tends to differ more than the total amount of lignin obtained from different species of woods but from fibers prepared in the same method.

A study was made to determine the yields of the various products obtained by the application of the process of the invention to different wood fibers of different wood species. Fiber was prepared and treated with alkali in accordance with the procedure set forth in the following four examples.

EXAMPLES

*Example 1:*—McMillan aspen fiber, i. e. raw wood fiber prepared from aspen wood by means of a McMillan defibrator was treated with dilute sodium hydroxide solution and processed in the following described manner which may be regarded as a preferred or primary embodiment of the invention. A sufficient amount of a 0.6% aqueous solution of sodium hydroxide (¼ normal solution) was used to provide a total alkali usage equivalent to 15% and a mixture consistency of about 4%. In other words, there was present about 15 parts sodium hydroxide to 100 parts of raw wood fiber on an oven dry basis. The fiber then comprised about 4 parts by weight per 100 parts of solution. The treatment was conducted at the boiling temperature of the solution at about normal atmospheric pressure for a duration of one hour. A recycling procedure was then employed in which the alkaline extract was fortified by the addition of caustic soda in an amount sufficient to build up the sodium hydroxide concentration to a strength level substantially that of the original solution. This required replacement of about 60% of the original sodium hydroxide. The fortified solution was then employed in the treatment of a further quantity of the raw wood fiber. A total of eight treatments of raw wood fiber was carried out in this manner, replenishing the concentration of sodium hydroxide in the treating solution between treatments. The extracted fiber was then separated from the solution and washed with water for subsequent uses. This resulted in the production of Extract I as an alkaline extract rich in materials removed from the wood substance, i. e. rich in lignins and in organics including polysaccharides-other-than-cellulose.

Sulfuric acid was added to the alkaline Extract I which had a pH of about 10 until it was

*Table V.—Yields of lignin from concentrates of varying percentage concentration*
[EXPRESSED IN PER CENT OF WEIGHT OF ORIGINAL OVEN DRY FIBER.]

| Concentrate | I | | II | | III | | IV | | V | |
|---|---|---|---|---|---|---|---|---|---|---|
| Salt Added | No | Yes | No | Yes | No | Yes | No | Yes | No | Yes |
| McMillan-Aspen Fiber: | | | | | | | | | | |
| Lignin 1-a | 0 | 4.36 | 4.82 | | 6.05 | | 5.70 | | 6.0 | |
| Lignin 1-b | | 0.18 | 2.06 | | 1.75 | | 1.10 | | 0.9 | |
| Lignin 1 | 4.71 | | | | | | | | | |
| Total Lignin | 4.71 | 4.54 | 6.88 | | 7.80 | | 6.80 | | 6.9 | |
| Asplund Aspen Fiber: | | | | | | | | | | |
| Lignin 1-a | 0 | 6.04 | 4.20 | 7.58 | 6.93 | | 7.36 | | [1]10.40 | |
| Lignin 1-b | | 0.75 | 4.08 | 0.75 | 1.10 | | 1.04 | | 0.51 | |
| Lignin 1 | 6.25 | | | | | | | | | |
| Total Lignin | 6.25 | 6.79 | 8.28 | 8.33 | 8.03 | | 8.40 | | [1]10.91 | |
| McMillan Jack Pine Fiber: | | | | | | | | | | |
| Lignin 1-a | | 3.91 | 3.66 | | 4.39 | | 5.61 | | 6.23 | |
| Lignin 1-b | | 1.89 | 2.37 | | | 2.11 | 1.62 | | .89 | |
| Lignin 1 | | | | | | | | | | |
| Total Lignin | | 5.80 | 6.03 | | 6.50 | | 7.23 | | 7.12 | |
| Asplund Jack Pine Fiber: | | | | | | | | | | |
| Lignin 1-a | | 5.25 | 6.15 | | 8.02 | | [1]9.63 | | 8.68 | |
| Lignin 1-b | | 2.26 | 2.45 | | 1.69 | | | 1.52 | | .95 |
| Lignin 1 | | | | | | | | | | |
| Total Lignin | | 7.51 | 8.60 | | 9.71 | | [1]11.15 | | 9.63 | |

[1] High figure due to contamination with PS-1.

approximately neutralized with a pH of about 7. The neutralized solution was then concentrated by evaporation, adding sulfuric acid as necessary to maintain the solution neutral, to about 12% of its original volume. In so doing a substantial salt concentration was established, the salts being formed by the reaction of the sulfuric acid with the alkali originally present. At this point lignin 1-a was substantially completely precipitated, and was separated from the solution by filtration. The neutral solution remaining after the separation of lignin 1-a was then acidified with sulfuric acid to a pH of about 1.5 in accordance with sequence C illustrated in Figure 1. Since the filtrate had been somewhat diluted by the wash water, sufficient sodium sulfate was added to restore the solution almost to saturation with the compound. The acidified, saturated solution was then steam distilled as at step 36' to recover the volatile organic acids, acetic and formic, as distillates 37, after which the solution was filtered in order to separate the lignin 1-b acid which had separated upon the salt saturation and heating of the solution by steam distillation.

*Example 2.*—Fiber prepared from aspen wood by means of the Asplund defibrator wherein the wood is subjected during defibration to the action of steam at about 128 to 135 pounds pressure per square inch gauge for about one minute was treated with dilute sodium hydroxide solution and processed in substantially the same manner as specified for Example 1.

*Example 3.*—McMillan jack pine fiber was treated with dilute sodium hydroxide solution and the extract processed in accordance with the procedure described in Example 1.

*Example 4.*—Fiber was prepared from jack pine by means of the Asplund defibrator wherein the wood was subjected during defibration to the action of steam at about 150 pounds per square inch gauge pressure (365° F.) for about one minute and was then treated with dilute sodium hydroxide solution and the extract was processed using substantially the same procedure as described in Example 1.

The percentage yields of products obtained from the above examples are set forth in Table VI below, and the percentage composition of lignin and the other organic materials not cellulose present in the original fiber before extraction and present in the residual fiber (Fiber I) after extraction are shown in Table VII below. The extent of solubilization by the alkali treatment can be ascertained by comparison of the total organics extracted as reported in Table VI with the composition of lignin and other organics not cellulose as reported in Table VII before extraction. Comparison of the data in Table VII before extraction with that after extraction indicates that the lignin and other organics not cellulose were extracted in a substantially uniform ratio, except possibly for Example 4.

*Table VI.—Yields of products*

[Expressed in percent of weight of original dry fiber]

| Fiber | McMillan Aspen (Example 1) | Asplund Aspen (Example 2) | McMillan Jack Pine (Example 3) | Asplund Jack Pine (Example 4) |
|---|---|---|---|---|
| Product: | | | | |
| Extracted fiber (Fiber I) | 81.3 | 79.6 | 84.1 | 78.9 |
| Total organics extracted (Extract I) | 18.7 | 20.4 | 15.9 | 21.1 |
| Lignins: | | | | |
| 1-a | 4.3 | 2.0 | 2.2 | 5.0 |
| 1-b | 1.2 | 4.1 | 1.3 | 1.5 |
| Total lignins | 5.5 | 6.1 | 3.5 | 6.5 |
| Total polysaccharides | 5.1 | 6.8 | 6.7 | 7.1 |
| Volatile acids | 5.8 | 5.9 | 2.9 | 4.4 |
| Total organics recovered | 16.4 | 18.8 | 13.1 | 18.0 |
| Remainder unaccounted for | 2.3 | 1.6 | 2.8 | 3.1 |

*Table VII.—Fiber compositions*

| Fiber | McMillan Aspen (Example 1) | Asplund Aspen (Example 2) | McMillan Jack Pine (Example 3) | Asplund Jack Pine (Example 4) |
|---|---|---|---|---|
| BEFORE EXTRACTION [1] | | | | |
| *Components* | | | | |
| Lignin | 20.1 | 20.8 | 29.6 | 29.6 |
| Other organics not cellulose | 21.6 | 21.8 | 15.1 | 13.6 |
| AFTER EXTRACTION [2] | | | | |
| Lignin | 20.0 | 18.5 | 29.6 | 30.4 |
| Other organics not cellulose | 22.4 | 20.0 | 14.0 | 9.0 |

[1] Expressed in per cent of weight of original dry fiber.
[2] Expressed in per cent of weight of dry residual fiber.

It will be appreciated that the process can be modified to minimize the amount of evaporation required, or even to eliminate the procedure, by conducting the alkali treatment at high consistency wherein the fiber is in a moist condition as distinguished from a mixture with water wherein the fiber is suspended in free water. A study was made to determine the yield of solubles obtained by such alkali treatment, the results of which are described in Examples 5 and 6 below:

*Example 5.*—McMillan aspen fiber was sprayed with caustic soda at 9% usage to provide a fiber consistency of approximately 50%. The material was mixed mechanically for 10 minutes at room temperature with the maximum temperature being near 30° C. The reacted mass was then washed free of alkalinity. The yield of solubles was 17.7%, based on the weight of original fiber used. A modification having 5% usage of caustic gave a fiber yield of 90.3% and a corresponding solubles yield of 9.7%.

*Example 6.*—Two samples of McMillan aspen fiber at 50% consistency and at caustic soda usages of 5% and 9%, respectively, were heated in a chamber at atmospheric pressure for 40 minutes at about 140° C. by introducing superheated steam into the chamber. The treated mass was then washed with hot water until free of alkalinity. Fiber I and solubles yields were as follows:

| Usage | Fiber Yield | Solubles Yield |
| --- | --- | --- |
| Per cent | Per cent | Per cent |
| 5 | 89.1 | 10.9 |
| 9 | 80.2 | 19.8 |

It will be seen in both Example 6 and 7 that the solubles yield with 9% usage of caustic soda was approximately the same as that obtained in Example 1, 2, 3 and 4. However, with only a 5% usage of caustic soda, the fiber yield is increased by an increment of from 8 to 10% and the extract yield is correspondingly decreased. Extract I from Examples 5 and 6 responds to processing for the recovery of the organic products contained therein with essentially the same kind of lignin and polysaccharide products being obtained, the only difference being a decreased yield of organic products in the case of the 5% usage of caustic soda.

SUMMARY

Each of the products obtained by this invention has many developed and potential industrial uses. The cellulosic fiber, which is obtained in a yield in the general range from 70% to 90%, may be employed without further refining in the manufacture of products, such as blankets, felts and boards and some grades of paper such as corrugating and liner board. It may also be used as a raw material to be processed further for the production of better grades of paper-making fiber, i. e. technical cellulose, and also for the production of chemical cellulose, or alpha cellulose. The extracted substances likewise have important uses. The lignins, for example, may be used in the manufacture of plastic clad plywood, impregnated papers, the tanning of leather, and as reagents for the recovery of metals from dilute solutions of metal salts. The polysaccharides obtainable by the process of the invention may be fermented or otherwise treated to form valuable products, as by chemical reaction, and by hydrogenolysis to form glycerol and related products. Both the lignin and the polysaccharide extracts may be utilized as raw materials for the preparation of valuable organic compounds, as by controlled oxidation processes.

The present invention permits on a commercial economic scale the separation of lignins and polysaccharides from the same solution. The process also resuls in the production of cellulose fiber without loss of the valuable lignin and polysaccharides-other-than-cellulose products, since, as has been described herein, the procedure is such as to recover substantially all of the said substances. Since the operating conditions and the concentration of the reagent used are relatively mild, the procedure does not drastically change the chemical constitution of the wood substance beyond the changes desired for permitting the separations. On the other hand, the extracted substances are obtained in forms approaching, if not almost identical with, the forms in which they are found in the wood itself. By using different woods and slightly varying the operating procedures, it is thus possible to produce a variety of products having a substantial range in properties so as to be useful for a diversity of purposes. These manifold advantages are achieved, furthermore, by a process which makes use of relatively inexpensive reagents and apparatus and does not require the use of pressure vessels and protracted cooking operations.

It is also apparent from a consideration of the flow plan that the process of the invention for the separation of the constituents of the alkaline extract is flexible and may be varied as desirable or necessary when processing different materials, especially different species of woods, over a wide range of operating conditions and with different reagent concentrations. Thus, although it is usually desirable to separate the total lignin content into specific component lignins because of the differences in properties of these lignins, and also because of the simplicity of operation obtainable when the total lignin content is isolated stepwise, it may be desirable in the case of certain alkaline extracts to effect the total precipitation of the lignins of Extract I in a single step, as by acidifying the extract to a pH of 1.5 in the presence of an effective salt content. It is also possible to recombine the lignins resulting from stepwise isolation in order to form a lignin product containing substantially all of the lignin content of the extract.

All the various modifications that may be practiced within the spirit of the disclosure herein and the novel products which may be obtained from the practice of the invention are deemed included in the invention.

What is claimed is:

1. The process of treating comminuted lignocellulose raw material to form a fibrous product and a chemical product therefrom, which comprises the steps of reacting at atmospheric pressure and at a temperature in the range from room temperature to about 140° C. the lignocellulose material with an alkaline reacting compound of an alkali metal in the presence of water, extracting with an essentially aqueous solvent the reaction products soluble therein, separating the solution thus obtained to leave as one product the extracted fibrous residue, adjusting the pH of the aqueous solution to a value of from about 7 to about 1.5, conditioning the said aqueous solution by establishing a substantial quantity of salt concentration whereby a lignin material is precipitated, and separating said lignin material as a second product.

2. The process of treating comminuted lignocellulose raw material to form fibrous and chemical products therefrom, which comprises the steps of reacting at atmospheric pressure and at a temperature in the range from room temperature to about 140° C. the lignocellulose material with an alkaline reacting compound of an alkali metal in the presence of water, extracting with an essentially aqueous solvent the reaction products soluble therein, separating the solution thus obtained to leave as one product the extracted fibrous residue, adjusting the pH of the aqueous solution to a value of about 1.5, conditioning the said aqueous solution by establishing a substantial quantity of salt concentration whereby a lignin material is precipitated, and separating said lignin material as a second product.

3. The process of claim 2 together with the further steps of treating said solution resulting from the separation of the lignin material to substantially remove the inorganic salt content thereof to thereby obtain as a third product a solution consisting primarily of organic materials present in the original raw material other than lignin and cellulose.

4. The process of treating comminuted lignocellulose raw material to form fibrous and chemical products therefrom, which comprises the steps of reacting at atmospheric pressure and at a temperature in the range from room temperature to about 140° C. the lignocellulose material with an alkaline reacting compound of an alkali metal in the presence of water, extracting with an essentially aqueous solvent the reaction products soluble therein, separating the solution thus obtained to leave as one product the extracted fibrous residue, adjusting the pH of the aqueous solution to a value of about 7, conditioning the said aqueous solution by establishing a substantial quantity of salt concentration whereby a lignin material is precipitated, and separating said lignin material as a second product.

5. The process as defined in claim 4 together with the further steps of adjusting the pH of the solution resulting from the separation of the lignin material to a value of approximately 5.0, further conditioning the solution to provide a substantial salt concentration to precipitate a second lignin material, and separating said second lignin material to recover same as a third product.

6. The process as defined in claim 4 together with the further steps of adjusting the pH of the solution resulting from the separation of the lignin material to a value of approximately 5.0, further conditioning the solution to provide a substantial salt concentration to precipitate a second lignin material, separating said second lignin material to recover same as a third product, further adjusting the pH of said solution resulting from the separation of said second lignin material to a pH of approximately 1.5, conditioning said solution to provide a substantial salt concentration to precipitate a third lignin material, and separating said third lignin material to recover same as a fourth product.

7. The process as defined in claim 4 together with the further steps of adjusting the pH of the solution resulting from the separation of the lignin material to a value of approximately 5.0, further conditioning the solution to provide a substantial salt concentration to precipitate a second lignin material, separating said second lignin material to recover same as a third product, further adjusting the pH of said solution resulting from the separation of said second lignin material to a pH of approximately 1.5, conditioning said solution to provide a substantial salt concentration to precipitate a third lignin material, separating said third lignin material to recover same as a fourth product, treating the solution resulting from the separation of the third lignin material to substantialy remove the inorganic salt content thereof to thereby obtain as a fifth product a solution consisting primarily of organic materials present in the original raw material other than lignocellulose.

8. The process as defined in claim 4 together with the additional steps of adjusting the pH of the solution resulting from the separation of said lignin material to a value of about 1.5 conditioning the said aqueous solution to provide a substantial quantity of salt concentration, whereby a second lignin material is precipitated, and separating said second lignin material to recover same as a third product.

9. The process as defined in claim 4 together with the additional steps of adjusting the pH of the solution resulting from the separation of said lignin material to a value of about 1.5, conditioning the said aqueous solution to provide a substantial quantity of salt concentration, whereby a second lignin material is precipitated, separating said second lignin material to recover same as a third product, and treating said solution resulting from the separation of the lignin material to substantially remove the inorganic salt content thereof to thereby obtain as a fourth product a solution consisting primarily of organic materials present in the original raw material other than lignin and cellulose.

10. The process of treating comminuted lignocellulose raw material to form fibrous and chemical products therefrom, which comprises the steps of reacting at atmospheric pressure and at a temperature in the range from room temperature to about 140° C. the lignocellulose material with an alkaline reacting compound of an alkali metal in the presence of water, extracting with an essentially aqueous solvent, the reaction products soluble therein, separating the solution thus obtained to leave as one product the extracted fibrous residue, adjusting the pH of the aqueous solution to a value of about 5.0, conditioning the said aqueous solution by establishing a substantial quantity of salt concentration whereby a lignin material is precipitated, and separating said lignin material as a second product.

11. The process as defined in claim 10 together with the additional steps of further adjusting the pH of said solution resulting from the separation of said lignin material to a value of approximately 1.5, conditioning said solution to provide a substantial salt concentration to precipitate a second lignin material, and separating said second lignin material to recover same as a third product.

12. The method which comprises reacting at atmospheric pressure the system: lignocellulose in defibered form, water and alkali metal hydroxide; in which system the alkali metal hydroxide is present in amount by weight in the range from 2.5 to 100 parts calculated as NaOH per 100 parts of oven dry lignocellulose, and the reaction is substantially completed to an equilibrium condition between the spent liquid and the fiber-form residue of the system at a reaction temperature in the range from room temperature to about 140° C.; separating the reaction products of said system into a water-extracted fiber residue and a separate body of liquid containing dissolved components of said reacted system including lignin and organics derived from the lignocellulose by the reaction of the system; adjusting with mineral acid the solution containing the solids content of said body of liquid at a concentration of the organics of said solids in the range of 1.5% to 20% by weight to impart a pH in a range from about 7 to 1.5 in the presence of a substantial quantity of dissolved alkali metal salt of mineral acid, whereby lignin is precipitated; and separating said lignin from the resulting solution.

13. The method of claim 12 applied to wood as a species of lignocellulose.

14. The method of claim 12 applied to wood as a species of lignocellulose and wherein the step of adjusting with mineral acid is conducted so as to impart a pH of 7 to precipitate a portion of the lignin.

15. The method of claim 12 applied to wood as a species of lignocellulose and wherein the step of adjusting with mineral acid is conducted so as to impart a pH of 1.5 to the solution obtained after separation of the fiber residue.

16. The method of claim 12 applied to wood as a species of lignocellulose and wherein the mineral acid used to adjust the pH to a range of from 7 to 1.5 is sulfuric acid.

17. The method which comprises reacting at atmospheric pressure the system: wood in defibered form, water and sodium hydroxide; in which system the sodium hydroxide is present in amount by weight of about 15 parts per 100 parts of oven dry wood, and the reaction is substantially completed to an equilibrium condition between the spent liquid and the fiber-form residue of the system at a reaction temperature in the range from room temperature to about 140° C.; separating the reaction products of said system into a water-extracted fiber residue and a separate body of liquid containing dissolved components of said reacted system including lignin and organics derived from the wood by the reaction of the system; adjusting with sulfuric acid the solution containing the solids content of said body of liquid at a concentration of the organics of said solids in the range of 1.5% to 20% by weight to impart a pH in a range from about 7 to 1.5 in the presence of a substantial quantity of dissolved alkali metal salt of sulfuric acid, whereby lignin is precipitated; and separating said lignin from the resulting solution.

18. The process for obtaining one or more lignin products from lignocellulose material containing water which comprises obtaining said material in comminuted form, treating said comminuted material with an alkaline reacting compound of an alkali metal at atmospheric pressure and at a temperature of from about normal room temperature to about 140° C., extracting the portion of said reacted lignocellulose material which is soluble in an essentially aqueous solvent leaving a lignocellulosic residue, separating the resulting aqueous alkaline solution from the said lignocellulosic residue, reducing the pH of said alkaline solution to a value near the neutral point, conditioning said solution for the precipitation therefrom of a lignin material by increasing its relative salt concentration whereby said lignin material precipitates and separating the thus precipitated lignin from the remaining solution.

19. The process as defined in claim 18 together with the further step of treating said lignin material with an essentially aqueous solvent for removing a portion of said lignin material soluble in said solvent and leaving as a residue a component of said first lignin material which is insoluble in said aqueous solvent.

20. The process as defined in claim 18 together with the further steps of treating said lignin material with an essentially aqueous solvent for dissolving a portion of said lignin material soluble in said solvent, separating as one product the portion of said lignin material insoluble in said solvent and recovering as a second product the solution containing said soluble portion.

21. The process of treating comminuted lignocellulose raw material to form fibrous and chemical products therefrom, which comprises the steps of reacting at atmospheric pressure and at a temperature in the range from room temperature to about 140° C. the lignocellulose material with an alkaline reacting compound of an alkali metal in the presence of water, extracting with an essentially aqueous solvent the reaction product soluble therein, separating the solution thus obtained to leave as one product the extracted fibrous residue, and thereafter precipitating from the aqueous solution a plurality of separate, distinct lignin products by reducing the pH value of the solution in successive stages and removing the lignin product which forms at each stage.

22. The process of producing a plurality of separate, distinct lignin products from an alkaline solution of lignin obtained by treating comminuted lignocellulose raw material with an alkaline reacting compound of an alkali metal in the presence of water, which comprises adding acid to the alkaline lignin solution in successive increments, and removing the lignin product formed upon the addition of each increment of acid.

23. The method of improving the precipitation characteristics of lignin in the process of producing lignin by the precipitation thereof from an aqueous alkaline solution by the addition of acid thereto, which comprises increasing the salt concentration of said aqueous solution to a value approaching saturation.

24. The method of improving the precipitation characteristics of lignin in the process of producing lignin by the precipitation thereof from an aqueous alkaline solution by the addition of acid thereto, which comprises removing water from the aqueous solution to thereby increase the salts concentration of the said solution.

25. The method of improving the precipitation characteristics of lignin in the process of producing lignin by the precipitation thereof from an aqueous alkaline solution by the addition of acid thereto, which comprises adding an inorganic salt to the aqueous solution until substantial saturation thereof.

CLARK C. HERITAGE.
WILLIAM G. VAN BECKUM.

REFERENCES CITED

The following references are of record in the file of this patent:

Wise: "Wood Chemistry," 1944, pages 286 to 288.